United States Patent
Zimmermann et al.

(10) Patent No.: US 11,255,296 B2
(45) Date of Patent: Feb. 22, 2022

(54) METHOD FOR ACTIVATING AN INJECTOR

(71) Applicant: Robert Bosch GmbH, Stuttgart (DE)

(72) Inventors: David Zimmermann, Weil Im Schoenbuch (DE); Helmar Gruhl, Steinheim An der Murr (DE); Johannes Schill, Ludwigsburg (DE); Stephan Topp, Leonberg (DE); Ulrich Funk, Hirschberg (DE)

(73) Assignee: Robert Bosch GmbH, Stuttgart (DE)

(*) Notice: Subject to any disclaimer, the term of this patent is extended or adjusted under 35 U.S.C. 154(b) by 399 days.

(21) Appl. No.: 16/540,848

(22) Filed: Aug. 14, 2019

(65) Prior Publication Data
US 2020/0063694 A1  Feb. 27, 2020

(30) Foreign Application Priority Data

Aug. 22, 2018  (DE) .......... 102018214135.5

(51) Int. Cl.
*F02D 41/30*  (2006.01)
*F02M 21/02*  (2006.01)

(52) U.S. Cl.
CPC ..... *F02M 21/0263* (2013.01); *F02D 41/3005* (2013.01); *F02M 21/0275* (2013.01)

(58) Field of Classification Search
CPC ............ F02M 21/0263; F02M 21/0275; F02D 41/3005; F02D 41/20; F02D 41/40; F02D 41/402; F02D 2041/202; Y02T 10/30; Y02T 10/40
USPC .......... 123/472, 478, 479, 480, 490
See application file for complete search history.

(56) References Cited

U.S. PATENT DOCUMENTS

| | | | |
|---|---|---|---|
| 6,253,736 B1* | 7/2001 | Crofts | F02M 47/027 123/467 |
| 6,760,212 B2* | 7/2004 | Cheever, Jr. | F02D 41/2096 361/152 |
| 6,997,159 B2* | 2/2006 | Stockner | F02M 51/061 123/322 |
| 7,004,150 B2* | 2/2006 | Augustin | F02D 41/2096 123/494 |
| 7,509,946 B2* | 3/2009 | Cooke | F02D 41/2096 123/498 |
| 8,201,543 B2* | 6/2012 | Morris | F02M 51/0603 123/494 |
| 8,479,711 B2* | 7/2013 | Morris | F02M 51/0603 123/490 |
| 8,863,727 B2* | 10/2014 | Jalal | F02M 51/0603 123/472 |

(Continued)

*Primary Examiner* — Hai H Huynh
(74) *Attorney, Agent, or Firm* — Norton Rose Fulbright US LLP; Gerard Messina

(57) ABSTRACT

A method for activating an injector for injecting fuel into an internal combustion engine, in which a nozzle needle of the injector moves from a closed position in the direction of an open position as long as an activation signal is applied to the injector. The nozzle needle of the injector moves from the open position into the closed position when the activation signal is absent. The duration of the activation signal is selected in such a way that the nozzle needle does not reach its completely open position. In specific operating states, a second activation signal is applied to the injector before reaching the closed position of the injector, which has the result that the nozzle needle of the injector moves back in the direction of the open position.

15 Claims, 3 Drawing Sheets

(56) References Cited

U.S. PATENT DOCUMENTS 10,907,562 B2 * 2/2021 Chia .................. F02D 41/3863

* cited by examiner

METHOD FOR ACTIVATING AN INJECTOR

RELATED APPLICATION INFORMATION

The present application claims priority to and the benefit of German patent application no. 10 2018 214 135.5, which was filed in Germany on Aug. 22, 2018, the disclosure of which is incorporated herein by reference.

FIELD OF THE INVENTION

Methods for activating injectors for injecting fuel into an internal combustion engine are known. In injection systems, the fuel quantities injected by injectors into combustion chambers are frequently divided into two or more partial injections. These normally include different quantities and are discharged by the injector at various time intervals in relation to one another. The main injection having the largest quantity of fuel significantly contributes to the torque of the internal combustion engine.

The fuel injection is carried out by the injector in such a way that by opening a switching valve inside the injector, pressure conditions are produced in the injector that effectuate an accelerated movement of a nozzle needle. Injection openings in the injector nozzle, through which the fuel reaches the combustion chamber, are released by this needle movement. The closing of the switching valve results in the movement reversal of the needle and finally in the closing of the injection holes upon reaching the needle seat of the nozzle needle. In so-called ballistic operation, the needle seat, in addition to the needle guides, forms the only surface which the nozzle needle contacts during its movement.

As long as an activation signal is applied to the injector, the nozzle needle of the injector moves from a closed position in the direction of an open position. When the activation signal is absent, the nozzle needle of the injector moves from the open position into the closed position. The duration of the activation signal is selected in such a way that the nozzle needle does not reach its fully open position, its mechanical stop. This type of energizing is typically referred to as ballistic activation.

To be able to implement larger injection quantities, the injector may be operated non-ballistically, or correspondingly larger-dimensioned injectors have to be installed. Both result in higher costs or also in inaccuracies in the quantity metering.

The injection quantity may not be increased arbitrarily by lengthening the activation duration of the switching valve—which is proportional to the valve opening duration—since the nozzle needle would leave the ballistic operating range. This is avoided to protect the injector, since the accuracy of the fuel metering is lower in the non-ballistic mode and the components are subject to stronger mechanical strain.

SUMMARY OF THE INVENTION

The method according to the present invention having the features of the independent claim has the advantage over the related art that an increase of the injection quantity may be achieved while simultaneously limiting the height of the trajectory of the nozzle needle. For this purpose, a second activation signal is applied to the injector in specific operating states before reaching the closed position, which has the result that the nozzle needle of the injector moves from the approach toward the closed position again back in the direction of the open position.

This may be achieved in that the switching valve is briefly closed during the injection and opened again after a pause time. An M-shaped curve thus results in the course of the lift of the nozzle needle. The injection quantity may be significantly increased in relation to the conventional solo injection by this procedure.

The injector is electrically activated twice in short succession. The second activation takes place sufficiently close with respect to time to the first activation that the nozzle needle is not yet closed again. This procedure is also referred to as continuous conveyance.

Large injection quantities may be provided by this multiple activation of an injector, which otherwise could not be implemented because of the component protection of the injector without changes in the injector configuration.

The injector and thus the switching valve are activated multiple times and thus opened and closed multiple times during one injection. The nozzle needle of the injector is not closed, and the injection is also not interrupted. The second activation takes place before the injection is ended. In the pause between the activations, the nozzle needle of the injector moves in the direction of the nozzle seat. The maximum needle lift is thus reduced in comparison to a corresponding solo injection. Before the nozzle needle reaches its seat, the switching valve is opened again. This means the nozzle needle changes its direction multiple times during one injection.

It is particularly advantageous if the interval of the activation signals is dimensioned in such a way that the nozzle needle does not close between the two activations. The nozzle needle need only move far enough (but may move farther) in the direction of the closed position that needle throttling does not yet take place.

Furthermore, it is advantageous if this type of activation takes place in operating states in which a variable characterizing the lift of the nozzle needle would exceed a threshold value. These are operating states in which the injected fuel quantity exceeds a threshold value.

In a further aspect, the present invention relates to novel program code together with processing instructions to produce a computer program executable on a control unit, in particular source code having compiling and/or linking instructions, the program code resulting in the computer program for executing all steps of one of the described methods when it is converted according to the processing instructions into an executable computer program, i.e., it is in particular compiled and/or linked. This program code may be provided in particular by source code, which is downloadable from a server in the Internet, for example.

An exemplary embodiment of the present invention is illustrated in the drawings and explained in greater detail in the following description.

DETAILED DESCRIPTION

Figure 1:
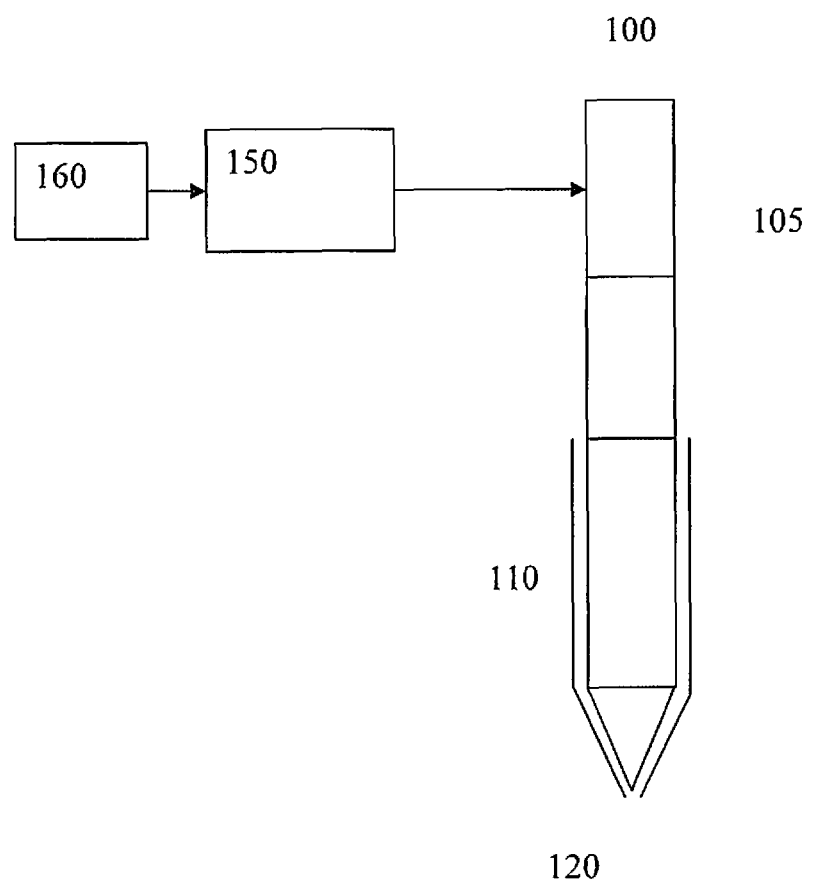
FIG. 1 shows an injector.

The essential elements of an injector 100 are roughly shown schematically in FIG. 1. Injector 100 essentially includes a switching valve 105, which is activated by a control unit 150. Control unit 150 evaluates the output signals of various sensors 160. Furthermore, a nozzle needle 110 is provided, which closes injection openings 120 in the injector nozzle in the non-energized state of switching valve 105. Nozzle needle 110 is in force equilibrium. This force equilibrium is disturbed by actuating switching valve 105, since pressurized fuel is discharged into the low-pressure area. In this way, nozzle needle 110 moves upward as shown in FIG. 1. Injection openings 120 are thus released, and the fuel enters the combustion chamber of the internal combustion engine.

Such injectors are typically operated in the ballistic mode, which means that the nozzle needle does not reach an upper stop. As soon as switching valve 105 is activated, a pressure relief takes place in the injector and nozzle needle 110 begins to move out of its seat, in which the injection openings are closed. As soon as nozzle needle 110 has lifted off out of its seat, the injection begins. If the activation of switching valve 105 is canceled, i.e., the energization is ended, it thus closes and nozzle needle 110 begins to move back in the direction of its seat. If the distance of the nozzle needle from the injection openings is still or again small, this is referred to as the needle seat throttling range. In this range, the injection rate does not reach its full level. If injection openings 120 are closed by nozzle needle 110, the injection ends. In the ballistic mode, nozzle needle 110 does not reach its second, upper stop. This is also not desirable, since increased material strains and injection quantity tolerances occur upon reaching the second stop.

An activation signal is typically applied to the switching valve of the injector before the nozzle needle has reached its completely open position, which has the result that the nozzle needle of the injector moves in the direction of the closed position. As soon as the nozzle needle reaches its seat, the injection ends. The duration, during which the switching valve is actuated, determines the injected fuel quantity. The activation duration is maximally sufficiently long that the nozzle needle does not reach its stop in the maximally open position.

Figure 2C:
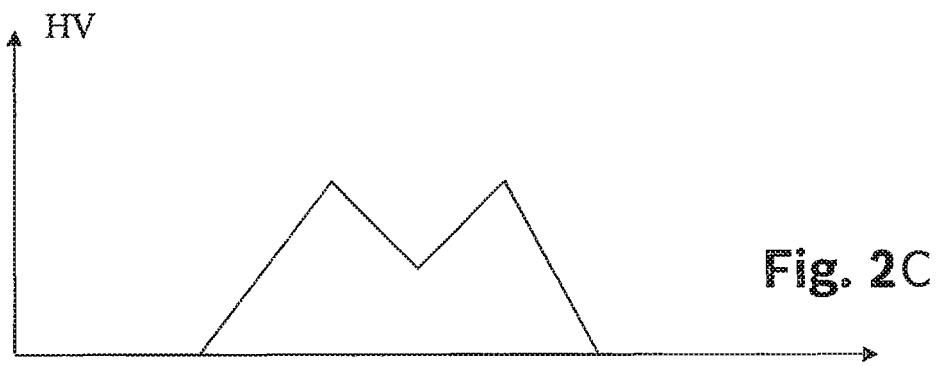
FIG. 2C shows various signals plotted over time.
Figure 2B:
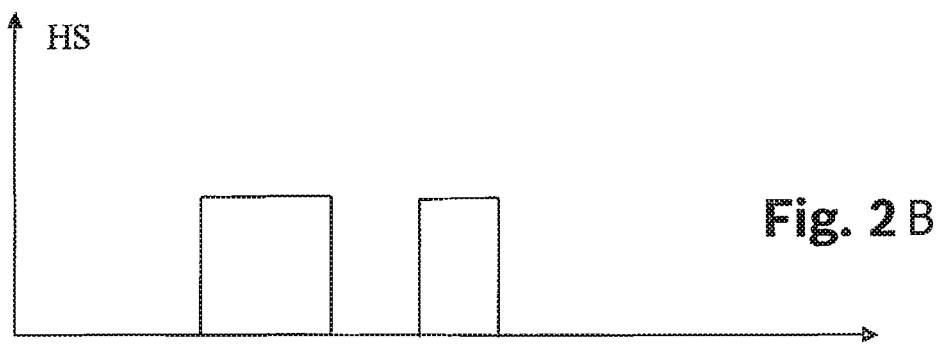
FIG. 2B shows various signals plotted over time.
Figure 2A:
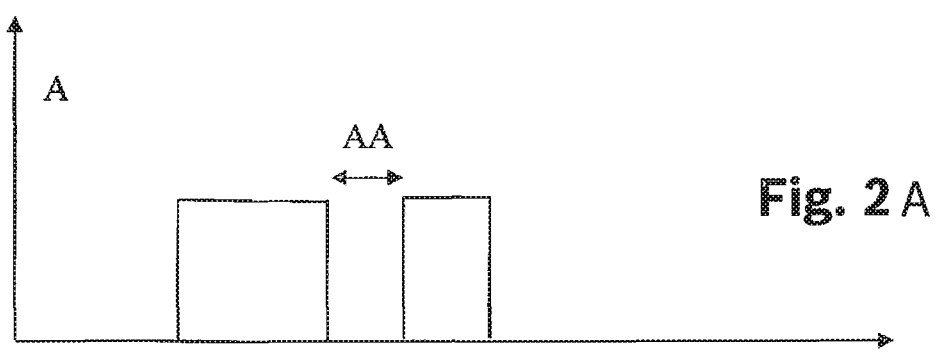
FIG. 2A shows various signals plotted over time.

In FIGS. 2A-2C, various signals are plotted over time. Partial FIG. 2A shows activation signal A for switching valve 105, FIG. 2B shows lift HS of switching valve 105. Lift HV of nozzle needle 110 is shown over time in FIG. 2C.

With the beginning of activation signal A, the switching valve moves out of its first seat into its second seat and effectuates a pressure relief in the control chamber and thus on the nozzle needle. This needle begins shortly thereafter to move out of its seat, and the injection begins. If the activation ends, i.e., activation signal A is canceled, the switching valve thus moves back into its starting position, the first seat. A movement reversal of the nozzle needle thereupon takes place and it moves back in the direction of its seat.

If a further activation of the switching valve takes place before the nozzle needle has reached its starting position, the nozzle needle thus moves away from its seat again. With the end of the activation, the switching valve again goes back into its starting position. This has the effect that the nozzle needle also moves back into the direction of its seat. If activation no longer takes place, the injection thus ends as soon as the nozzle needle reaches its seat.

It is provided according to the present invention that a further activation takes place to increase the fuel quantity to be injected. This activation is dimensioned in such a way that the injection procedure is not interrupted, i.e., the nozzle needle does not reach its seat position. In specific operating states, in which a large fuel quantity is desired, an activation signal is again applied to the injector before reaching the closed position, which has the result that the nozzle needle of the injector moves from the closed position back in the direction of the open position. Such an injection is referred to hereafter as an M-injection.

The procedure according to the present invention is not restricted to two activations. It may also be provided that more than two activations of the switching valve take place per injection.

The interval of the two activation signals is dimensioned in such a way that the nozzle needle does not close between the two activations. This means that the switching valve is activated twice and completely closes between the two activations. However, the nozzle needle does not reach its closed position.

A substantially larger fuel quantity may be metered to the internal combustion engine using this type of activation than in the case of an injection pattern having two partial injections, in which the two partial injections are subject to a greater interval.

The activation of the switching valve is carried out in such a way that the needle lift does not exceed a maximum needle lift and does not fall below a minimum needle lift. If the needle lift falls below the minimum needle lift, this results in needle throttling and thus a reduced injection rate. This means, the injection quantity per unit of time would decrease. To achieve a linear and continuous relationship between the activation duration and the injection quantity, no needle throttling may occur. This is achieved according to the present invention in that a certain electrical maximum interval between the two activations is not exceeded, so that the nozzle needle does not approach too closely to the nozzle seat in the activation pause. This means, interval AA of the two activations is predefined in such a way that this maximum interval, in the case of which needle throttling occurs, is not exceeded.

The maximum needle lift is given by the geometric injector conditions—lift stop. The activation duration and the beginning of the movement (nozzle seat or located on ballistic trajectory) are decisive here for the particular partial injections.

Figure 3:
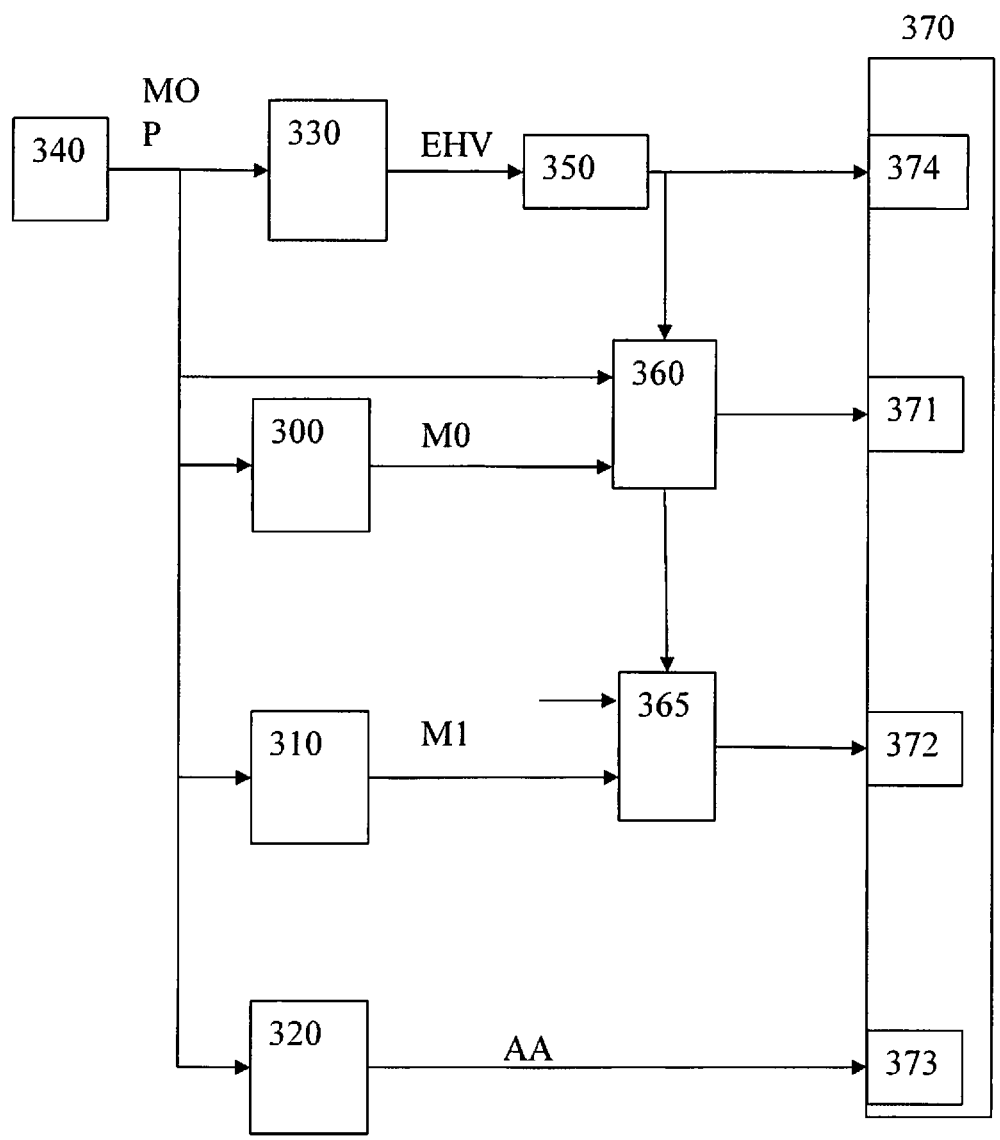
FIG. 3 shows a block diagram to illustrate the procedure according to the present invention.

For this purpose, the existing activation structure is supplemented with an activation structure according to the present invention. It is decided therein whether an injection is to be discharged conventionally as a solo injection or as an M-injection. One specific embodiment of this activation structure is shown in FIG. 3.

In the specific embodiment described hereafter having a division into two partial activations, essentially four further characteristic maps are provided. Valve opening duration M0 for the first activation of the switching valve is stored in a first characteristic map 300 and valve opening duration M1 for the second activation of the switching valve is stored in a second characteristic map 310. Interval AA of the two activations is stored in an activation pause characteristic map 320. A needle lift replacement characteristic map is identified by 330.

Inter alia, rail pressure P and a desired valve opening duration MO of the nozzle needle are used as input variables for the characteristic maps. These variables are provided to the characteristic maps by a specification 340. This specification 340 may be configured as a sensor, for example, for the rail pressure. Valve opening duration MO is an internal variable of the control unit for controlling the injection. The valve opening duration corresponds to the duration during which nozzle needle 110 is or is supposed to be open and which enables the injection of fuel. Instead of the valve opening duration, another variable which characterizes the valve opening duration may also be used. The fuel quantity to be injected is typically computed proceeding from the driver intention. The valve opening duration required for this purpose is determined from the fuel quantity to be injected. The activation signal for activating the switching valve is determined proceeding from the valve opening duration. All variables of this chain of computations may be used as a variable which characterizes the valve opening duration. These are in particular the desired duration of the injection or the fuel quantity to be injected.

Either the needle lift of nozzle needle 110 or an equivalent replacement variable is stored in needle lift replacement characteristic map 330. Starting value EHV from this characteristic map 330 is subjected to a hysteresis logic 350. Undesired switching back and forth at an operating point close to the switchover threshold is thus to be avoided. Starting signal EHV reaches a first and second selection unit 360 and 365. The particular state, whether an M-injection or a solo injection takes place, is also ascertained proceeding from starting value EHV. This starting value EHV corresponds to needle lift HV of nozzle needle 110. In the case of a solo injection, this variable EHV is equivalent to real needle lift DM.

If the value of EHV is less than a lower threshold value in the hysteresis evaluation, a solo injection thus takes place. In this case, selection unit 360 relays valve opening duration M0 (corresponding in this case to MO) directly to input 371 of an activation computation unit 370. Furthermore, the signal with respect to the status that a solo injection takes place is conducted to status input 374 of activation computation unit 370.

If the value of EHV is greater than an upper threshold value in the hysteresis evaluation, an M-injection thus takes place. In this case, selection unit 360 relays the output signal of first characteristic map 300—valve opening duration M0 for the first activation—to input 371. Selection unit 365 relays the output signal of second characteristic map 310—valve opening duration M1 for the second activation—to input 372 of activation computation unit 370. Moreover, output signal AA of activation pause characteristic map 320 reaches input 373 of activation computation unit 370. Furthermore, the signal with respect to the status that an M-injection takes place is conducted to status input 374 of activation computation unit 370. Activation computation unit 370 converts these variables into activation signals A for activating the switching valve.

If the value of EHV exceeds a specific threshold value, a transition is thus made to an M-injection. Below a threshold value, a solo injection is carried out. To avoid inadvertent switching back and forth between M-injection and solo injection, a hysteresis logic 350 is implemented.

Valve opening duration M0 of the first injection and the status regarding whether a solo injection or an M-injection is to be carried out are used as input variables of activation computation unit 370. In the case of an M-injection, in addition valve opening duration M1 of the second partial activation and interval AA between the activations are used.

If needle lift value EHV or its equivalent does not exceed the upper threshold value, the input variable of the valve opening duration is relayed directly to activation computation unit 370. The status is set to solo injection. Activation computation unit 370 computes the duration of the activation for which the switching valve is activated. This corresponds to the conventional solo injection.

However, if needle lift EHV or its equivalent exceeds the upper threshold value, the input variables of valve opening duration and rail pressure are conducted to three characteristic maps. On the basis of these values, a valve opening duration M0 for the first activation, a second valve opening duration M1 for the second activation, and an injection pause AA are ascertained and conducted to activation computation unit 370. This unit computes the two activation signals having the corresponding interval. Furthermore, the status M-injection is set.

What is claimed is:

1. A method for activating an injector for injecting fuel into an internal combustion engine, the method comprising:
   moving a nozzle needle of the injector from a closed position in the direction of an open position as long as an activation signal is applied to the injector;
   moving the nozzle needle of the injector from the open position in the direction of the closed position when the activation signal is absent, wherein a duration of the activation signal is selected so that the nozzle needle does not reach its completely open position; and
   applying, in specific operating states, a second activation signal to the injector before reaching the closed position, which has the result that the nozzle needle of the injector moves back in the direction of the open position.

2. The method of claim 1, wherein the interval of the activation signals is dimensioned so that the nozzle needle does not close between the two activations.

3. The method of claim 1, wherein the specific operating states exist if a variable characterizing the lift of the nozzle needle would exceed a threshold value.

4. The method of claim 1, wherein the variable characterizing the lift of the nozzle needle is specified proceeding from the rail pressure and a valve opening duration.

5. The method of claim 4, wherein the valve opening duration of the two activations and the interval of the two activation durations is determined proceeding from the rail pressure and the valve opening duration.

6. A non-transitory computer readable medium having a computer program, which is executable by a processor, comprising:
   a program code arrangement having program code for injecting fuel into an internal combustion engine, by performing the following:
      moving a nozzle needle of the injector from a closed position in the direction of an open position as long as an activation signal is applied to the injector;
      moving the nozzle needle of the injector from the open position in the direction of the closed position when the activation signal is absent, wherein a duration of the activation signal is selected so that the nozzle needle does not reach its completely open position; and
      applying, in specific operating states, a second activation signal to the injector before reaching the closed position, which has the result that the nozzle needle of the injector moves back in the direction of the open position.

7. The computer readable medium of claim 6, wherein the interval of the activation signals is dimensioned so that the nozzle needle does not close between the two activations.

8. The computer readable medium of claim 6, wherein the specific operating states exist if a variable characterizing the lift of the nozzle needle would exceed a threshold value.

9. The computer readable medium of claim 6, wherein the variable characterizing the lift of the nozzle needle is specified proceeding from the rail pressure and a valve opening duration.

10. The computer readable medium of claim 9, wherein the valve opening duration of the two activations and the interval of the two activation durations is determined proceeding from the rail pressure and the valve opening duration.

11. A control unit, comprising:
a control device configured for injecting fuel into an internal combustion engine, by performing the following:
moving a nozzle needle of the injector from a closed position in the direction of an open position as long as an activation signal is applied to the injector;
moving the nozzle needle of the injector from the open position in the direction of the closed position when the activation signal is absent, wherein a duration of the activation signal is selected so that the nozzle needle does not reach its completely open position; and
applying, in specific operating states, a second activation signal to the injector before reaching the closed position, which has the result that the nozzle needle of the injector moves back in the direction of the open position.

12. The control unit of claim 11, wherein the interval of the activation signals is dimensioned so that the nozzle needle does not close between the two activations.

13. The control unit of claim 11, wherein the specific operating states exist if a variable characterizing the lift of the nozzle needle would exceed a threshold value.

14. The control unit of claim 11, wherein the variable characterizing the lift of the nozzle needle is specified proceeding from the rail pressure and a valve opening duration.

15. The control unit of claim 14, wherein the valve opening duration of the two activations and the interval of the two activation durations is determined proceeding from the rail pressure and the valve opening duration.

* * * * *